(12) United States Patent
Liang

(10) Patent No.: US 10,983,858 B2
(45) Date of Patent: Apr. 20, 2021

(54) DATA WRITING METHOD, MEMORY CONTROL CIRCUIT UNIT AND MEMORY STORAGE DEVICE

(71) Applicant: PHISON ELECTRONICS CORP., Miaoli (TW)

(72) Inventor: Li-Chun Liang, Kaohsiung (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/586,911

(22) Filed: Sep. 28, 2019

(65) Prior Publication Data

US 2021/0049064 A1 Feb. 18, 2021

(30) Foreign Application Priority Data

Aug. 14, 2019 (TW) .................. 108128920

(51) Int. Cl.
*G06F 11/00* (2006.01)
*G08C 25/00* (2006.01)
*H03M 13/00* (2006.01)
*H04L 1/00* (2006.01)
*G06F 11/10* (2006.01)
*G06F 3/06* (2006.01)

(52) U.S. Cl.
CPC ........ *G06F 11/1004* (2013.01); *G06F 3/0623* (2013.01); *G06F 3/0659* (2013.01); *G06F 3/0679* (2013.01)

(58) Field of Classification Search
CPC .. G06F 11/1004; G06F 3/0679; G06F 3/0659; G06F 3/0623
See application file for complete search history.

(56) References Cited

U.S. PATENT DOCUMENTS

| 2008/0276149 | A1* | 11/2008 | Kong | .................. | G06F 11/1008 714/752 |
| 2017/0063401 | A1* | 3/2017 | Jeganathan | ......... | G06F 11/1048 |

* cited by examiner

*Primary Examiner* — Samir W Rizk
(74) *Attorney, Agent, or Firm* — JCIPRNET

(57) ABSTRACT

A data writing method, a memory control circuit unit, and a memory storage device are provided. The method includes: receiving a first sub-data of a plurality of sub-data of a first data and generating a first error detecting code corresponding to the first sub-data; receiving a second sub-data of the plurality of sub-data of the first data and generating a second error detecting code corresponding to the second sub-data; combining the first error detecting code and the second error detecting code to obtain a third error detecting code, wherein the third error detecting code is used to check whether a second data formed by combining the first sub-data and the second sub-data has an error; and storing the second data and the third error detecting code into a rewritable non-volatile memory module.

30 Claims, 9 Drawing Sheets

DATA WRITING METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 108128920, filed on Aug. 14, 2019. The entirety of the above-mentioned patent application is hereby incorporated by reference herein and made a part of this specification.

BACKGROUND

1. Technology Field

The invention relates to a data writing method, a memory control circuit unit and a memory storage device.

2. Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., a flash memory) ideal to be built in the portable multi-media devices as cited above.

In general, for preventing errors in the process of data transmission, when a memory management circuit writes a data into the rewritable non-volatile memory module, an error detecting code corresponding to the data is usually written together. When the data is to be read, the error detecting code can be used to check if the read data has an error (e.g., contains an error bit).

However, it should be noted that the data can usually be divided further into multiple sub-data. In certain cases, after obtaining one sub-data of the data, the memory management circuit may have to instantly write the obtained sub-data and an error detecting code corresponding to the sub-data into the rewritable non-volatile memory module. Afterward, when the memory management circuit obtains another sub-data of the data, it is assumed that the memory management circuit will write said another sub-data and an error detecting code corresponding to said another sub-data into the rewritable non-volatile memory module. Later, at a specific time point (e.g., when the rewritable non-volatile memory module is re-powered after power failure or is idle), the memory management circuit can combine the first obtained sub-data and the second obtained another sub-data in the rewritable non-volatile memory module to generate a combined data, generate an error detecting code corresponding to the combined data, and store the combined data and the error detecting code corresponding to the combined data into the rewritable non-volatile memory module.

It should be noted that in the process of generating the error detecting code corresponding to the combined data, the memory management circuit usually needs to read the first obtained sub-data and the second obtained another sub-data from the rewritable non-volatile memory module to a buffer memory in order to generate the combined data according to the read sub-data. After the combined data and the error detecting code corresponding to the combined data are generated, the memory management circuit writes the combined data and the error detecting code corresponding to the combined data into the rewritable non-volatile memory module. However, in the process of reading the sub-data from the rewritable non-volatile memory module and then writing the combined data back to the rewritable non-volatile memory module, the error bit may be generated due to cosmic rays or other unpredictable factors. How to prevent the error bit generated in the combined data and efficiently generate the error detecting code corresponding to the combined data is one of the problems to be solved by those skilled in the art.

SUMMARY

The invention provides a data writing method, a memory control circuit unit and a memory storage device which can prevent the error bit generated in the combined data in the prior art.

The invention proposes a data writing method for a rewritable non-volatile memory module, and the data writing method includes: receiving a first sub-data of a plurality of sub-data of a first data, and generating a first error detecting code corresponding to the first sub-data; receiving a second sub-data of the plurality of sub-data of the first data, and generating a second error detecting code corresponding to the second sub-data; combining the first error detecting code and the second error detecting code to obtain a third error detecting code, wherein the third error detecting code is used to check whether a second data formed by combining the first sub-data and the second sub-data has an error; and storing the second data and the third error detecting code into the rewritable non-volatile memory module.

The invention proposes a memory control circuit unit configured to control a rewritable non-volatile memory module. The memory control circuit unit includes a host interface, a memory interface and a memory management circuit. The host interface is configured to couple to a host system. The memory interface is configured to couple to a rewritable non-volatile memory module. The memory management circuit is coupled to the host interface and the memory interface, and configured to perform the following operations of: receiving a first sub-data of a plurality of sub-data of a first data, and generating a first error detecting code corresponding to the first sub-data; receiving a second sub-data of the plurality of sub-data of the first data, and generating a second error detecting code corresponding to the second sub-data; combining the first error detecting code and the second error detecting code to obtain a third error detecting code, wherein the third error detecting code is used to check whether a second data formed by combining the first sub-data and the second sub-data has an error; and storing the second data and the third error detecting code into the rewritable non-volatile memory module.

The invention proposes a memory storage device, which includes a connection interface unit, a rewritable non-volatile memory module and a memory control circuit unit. The connection interface unit is configured to couple to a host system. The memory control circuit unit is configured to couple to the connection interface unit and the rewritable non-volatile memory module, and configured to perform the following operations of: receiving a first sub-data of a plurality of sub-data of a first data, and generating a first error detecting code corresponding to the first sub-data; receiving a second sub-data of the plurality of sub-data of the first data, and generating a second error detecting code corresponding to the second sub-data; combining the first error detecting code and the second error detecting code to obtain a third error detecting code, wherein the third error detecting code is used to check whether a second data formed by combining the first sub-data and the second sub-data has an error; and storing the second data and the third error detecting code into the rewritable non-volatile memory module.

Based on the above, the data writing method, the memory control circuit unit and the memory storage device of the invention can simply read the error detecting code of the sub-data to be combined without reading the sub-data to be combined in the process of generating the combined data and the error detecting code corresponding to the combined data. Then, according to the read error detecting code, the error detecting code corresponding to the combined data can be generated. Further, in the process of generating the combined data, because the combined data can be generated by directly moving the sub-data in the rewritable non-volatile memory module without reading the sub-data to be combined to the buffer memory in the invention, the problem of the error bit generated in the combined data in the prior art can be solved.

To make the aforementioned more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

DESCRIPTION OF THE EMBODIMENTS

Figure 1:
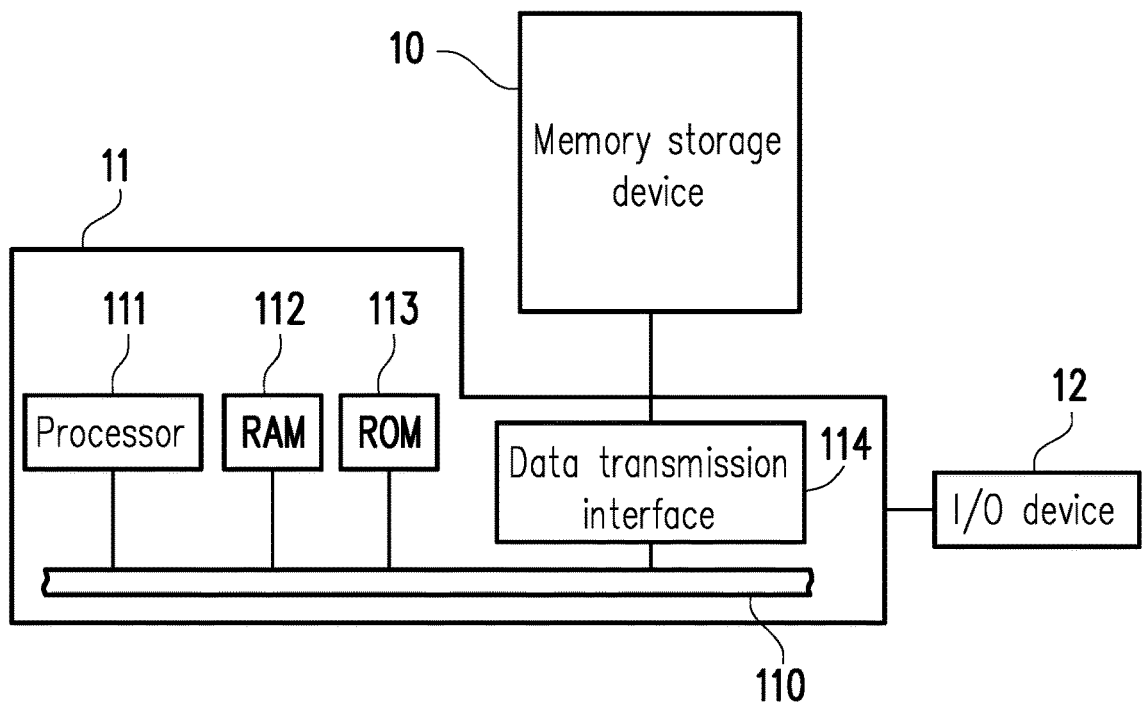
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
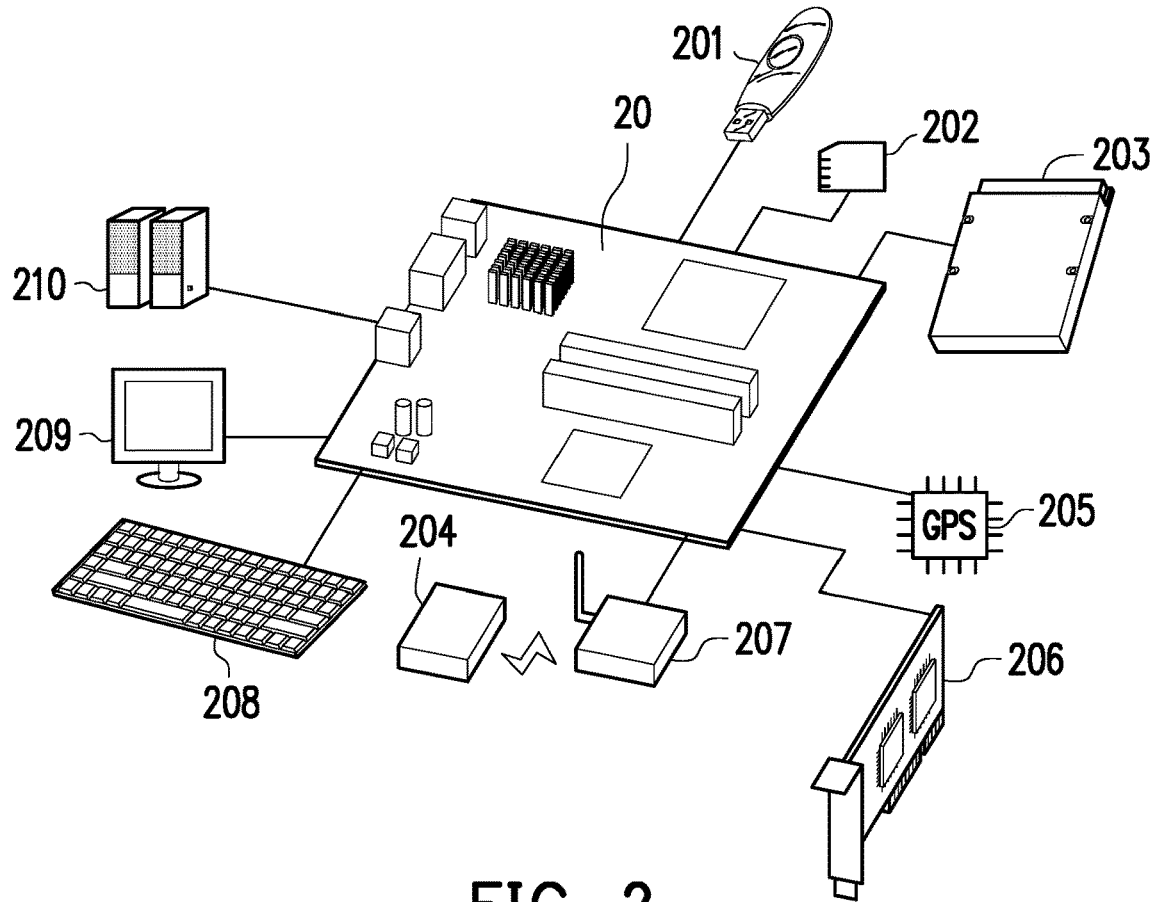
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 510 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
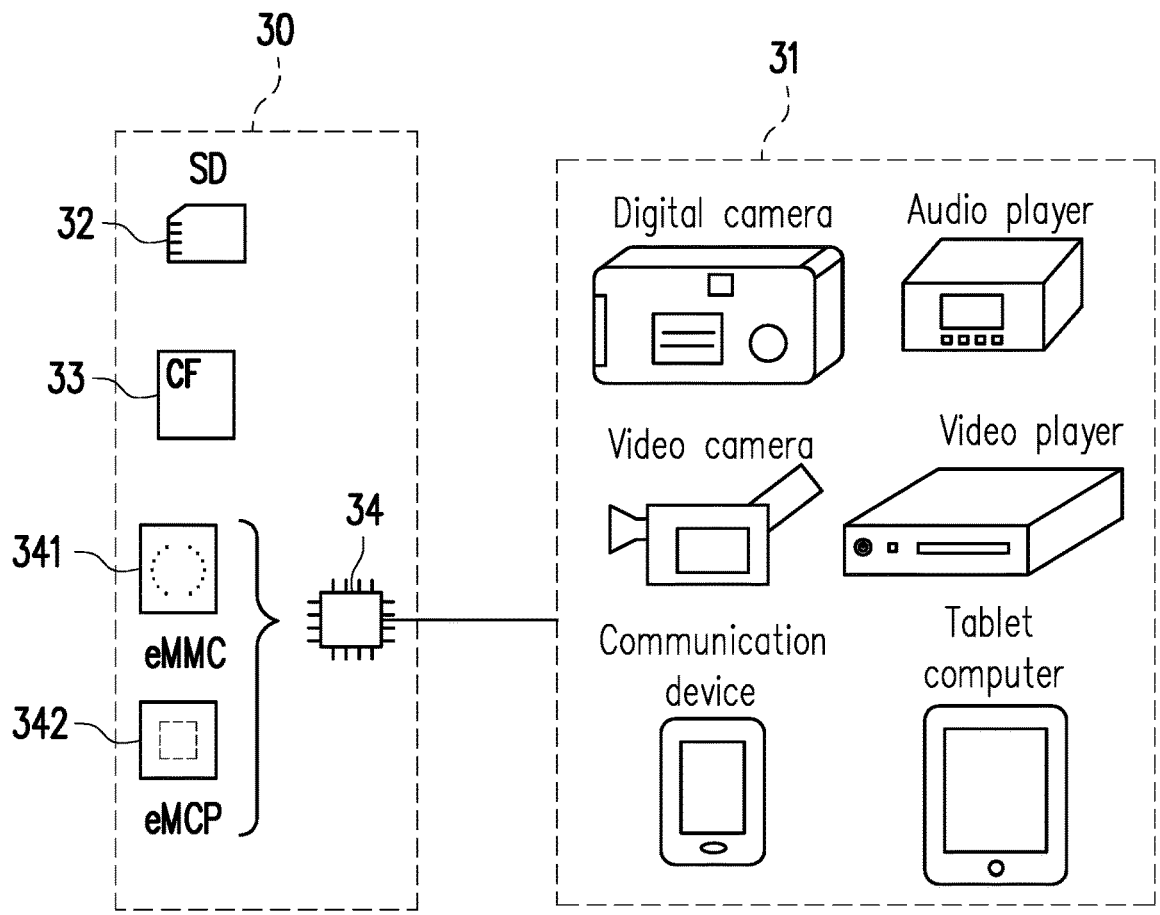
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 931, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
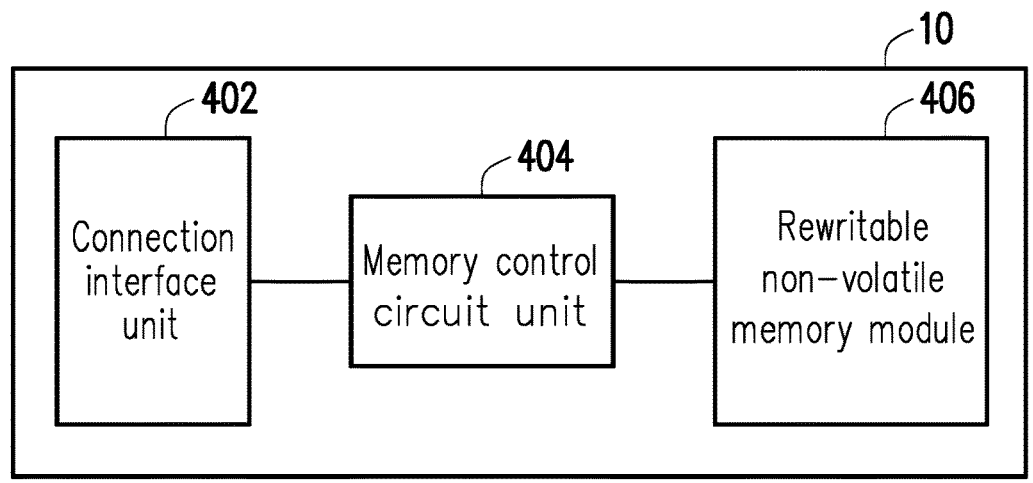
FIG. 4 is a schematic block diagram illustrating a memory storage device according to an exemplary embodiment of the invention.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. In the present exemplary embodiment, the connection interface unit 402 is compatible with a PCI Express (Peripheral Component Interconnect Express) interface standard, and is also compatible with an NVM express interface standard. Specifically, the NVM express interface standard refers to a protocol for communication between the host system and the memory storage device, which defines register interface, command set and feature set between a controller of the memory storage device and an operating system of the host system and aims to improve a data access speed and a data transmission rate for the PCIe interface-based memory storage device by optimizing the interface standard of the memory storage device. However, in another exemplary embodiment, the connection interface unit 402 may also be compatible with other suitable standards. In addition, the connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". By changing the threshold voltage, each of the memory cells in the rewritable non-volatile memory module 406 can have a plurality of storage states. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit is a physical page or a physical sector. If the physical programming unit is the physical page, these physical programming units usually include a data bit area and a redundancy bit area. The data bit area includes multiple physical sectors configured to store user data, and the redundant bit area is configured to store system data (e.g., management data such as the error correcting code). In this exemplary embodiment, the data bit area contains 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
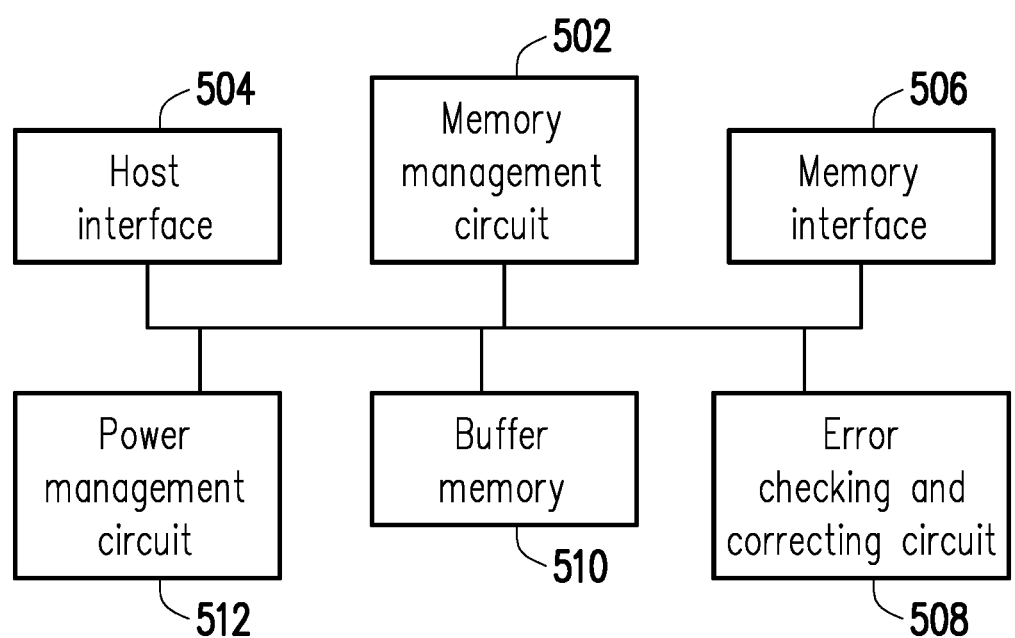
FIG. 5 is a schematic block diagram illustrating a memory control circuit unit according to an exemplary embodiment of the invention.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), a ROM (not illustrated) and a RAM (not illustrated). In particular, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes and instruct the rewritable non-volatile memory module 406 to execute the corresponding operations, such as writing, reading and erasing. In an exemplary embodiment, the memory management circuit 502 may further send command sequences of other types to instruct the rewritable non-volatile memory module 406 to execute the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In this exemplary embodiment, the host interface 504 is compatible with the SATA standard. Nevertheless, it should be understood that the invention is not limited in this regard. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals, or data transmitted in the bus. The signals or the data may include command codes and program codes. For example, information such as identification codes and memory addresses are included in the read command sequence;

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives the writing command from the host system 11, the error checking and correcting circuit 508 generates an error correcting code (ECC) or an error detecting code (EDC) for data corresponding to the writing command, and the memory management circuit 502 writes data and the ECC or the EDC corresponding to the writing command to the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

It should be noted that, the data writing method of the invention can be applied to the rewritable non-volatile memory module that stores data in encrypted or non-encrypted manner. The first embodiment below is described by using the rewritable non-volatile memory module 406 that stores a non-encrypted data. The second embodiment below is described by using the rewritable non-volatile memory module 406 that stores an encrypted data.

It is noted that in the following description, some terms may be replaced with corresponding abbreviations for ease of reading (see Table 1).

TABLE 1

| | |
|---|---|
| rewritable non-volatile memory module | RNVM module |
| physical page | PP |
| memory management circuit | MMC |
| error detecting code | EDC |

First Embodiment

Figure 6A:
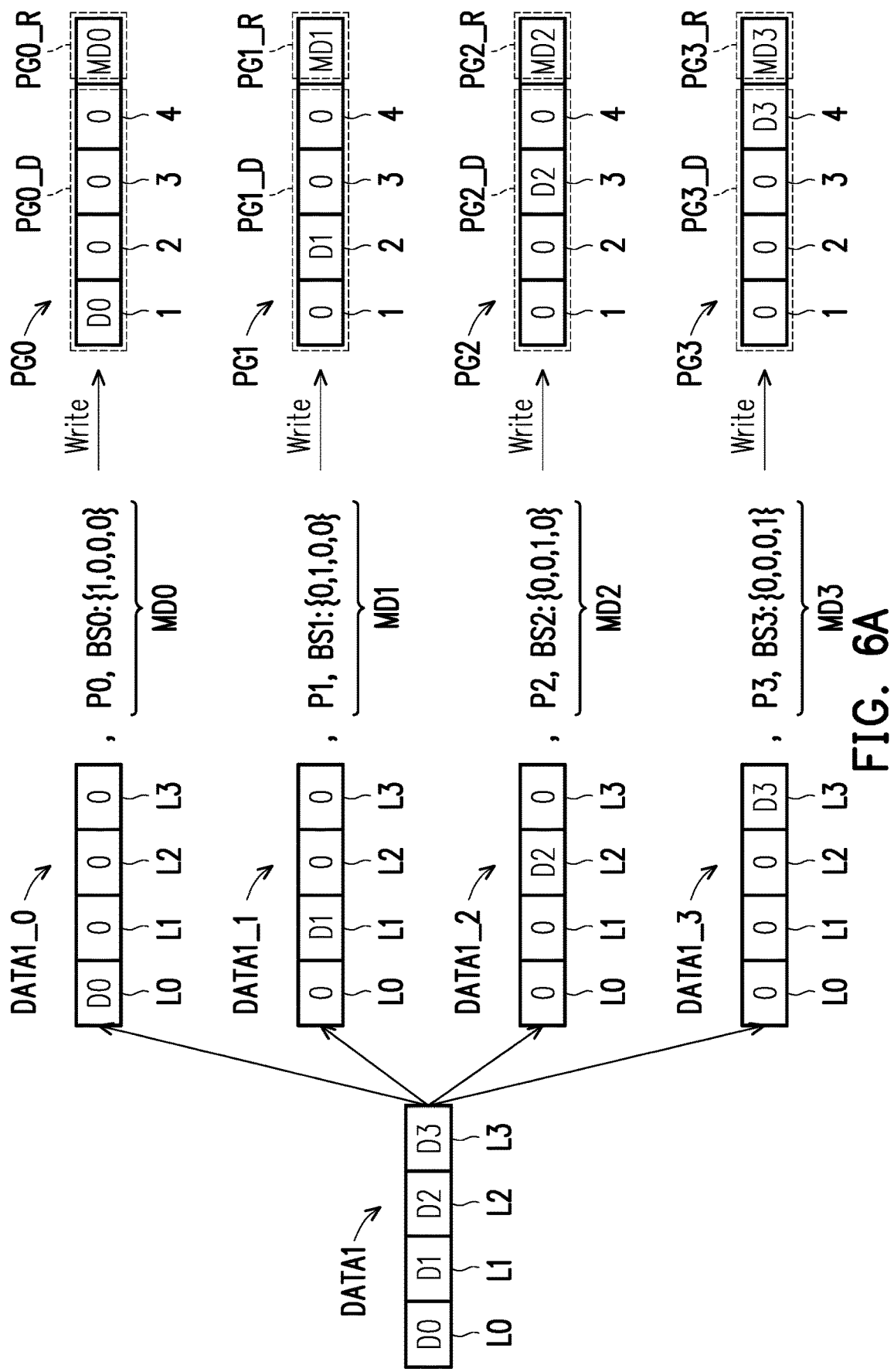
FIG. 6A to FIG. 6C are schematic diagrams illustrating an example of a data writing method according to an exemplary embodiment of the invention.
Figure 6B:
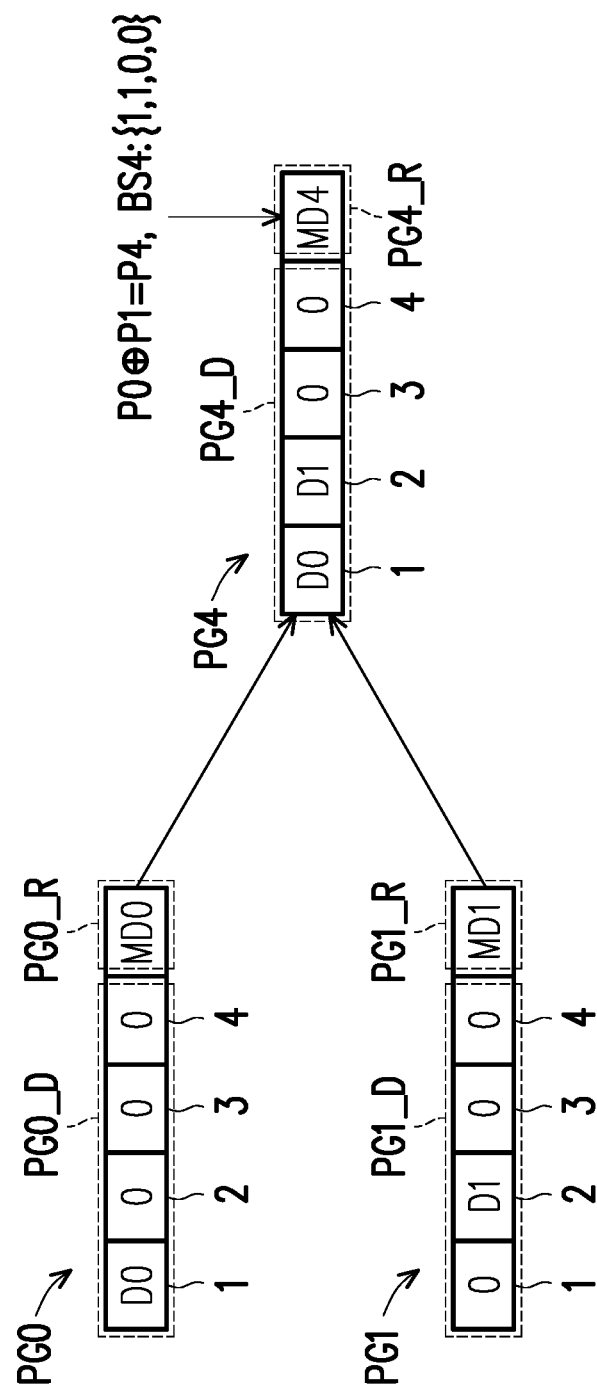
Figure 6C:
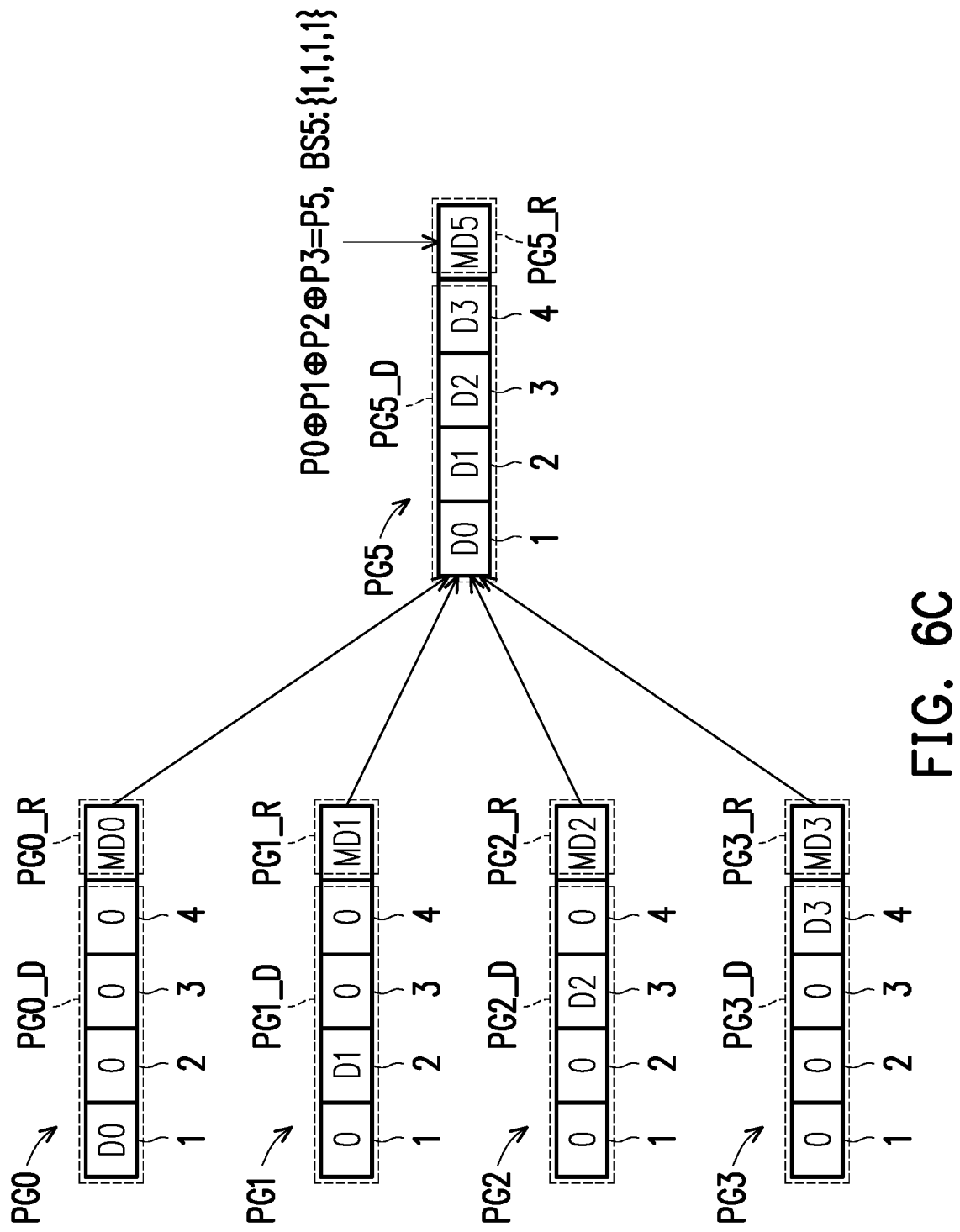

FIG. 6A to FIG. 6C are schematic diagrams illustrating an example of a data writing method according to an exemplary embodiment of the invention. For illustrative convenience, it is assumed here that a PP in the RNVM module has four physical sectors.

Referring to FIG. 6A, it is assumed here that a data DATA1 (a.k.a. a first data) includes sub-data D0 to D3. A size of the data DATA1 exactly matches a size of the data bit area of one PP, and each of the sub-data D0 to D3 exactly matches a size of one physical sector. In the example of FIG. 6A, the sub-data D0 to D3 are arranged in an order. For example, the sub-data D0 (a.k.a. a first sub-data) is arranged at a location L0 (a.k.a. a first location) in the order; the sub-data D1 (a.k.a. a second sub-data) is arranged at a location L1 (a.k.a. a second location) in the order; the sub-data D2 is arranged at a location L2 in the order; the sub-data D3 is arranged at a location L3 in the order.

It is assumed that the MMC 502 first obtains the sub-data D0 from the host system 11. The MMC 502 generates an EDC P0 (a.k.a. a first EDC) corresponding to the sub-data D0 and stores the sub-data D0 and the EDC P0 into the RNVM module 406.

More specifically, the MMC 502 assigns the sub-data D0 to the location L0 which is its original location in the data DATA1 and sets a plurality of bits at locations other than the location L0 (i.e., the locations L1 to L3) to zero to generate a zero-filled data DATA1_0 (a.k.a. a first zero-filled data), and generates the EDC P0 according to the zero-filled data DATA1_0. It should be noted that, an algorithm for generating the EDC P0 is not limited in the invention. In an embodiment, the EDC P0 is generated by using, for example, a cyclic redundancy check (CRC) algorithm. It should be noted that, for simplicity, each of the locations L1 to L3 in the zero-filled data DATA1_0 is represented by one zero in FIG. 6A. However, in the actual situation, each location among the locations L1 to L3 includes multiple bits and these bits are set to zero. A similar representation is also applied to other zero-filled data.

In addition, the MMC 502 also records a bit sequence BS0 (a.k.a. a first bit sequence). In the bit sequence BS0, each bit corresponds to one of the location L1 to L3 in the zero-filled data DATA1_0. The first bit in the bit sequence BS0 corresponds to the location L0 in the zero-filled data DATA1_0; the second bit in the bit sequence BS0 corresponds to the location L1 in the zero-filled data DATA1_0; the third bit in the bit sequence BS0 corresponds to the location L2 in the zero-filled data DATA1_0; the fourth bit in the bit sequence BS0 corresponds to the location L3 in the zero-filled data DATA1_0. In this example, because only the location L0 stores the data D0 and the bits at the locations L1 to L3 are all zero in the zero-filled data DATA1_0, the MMC 502 sets the first bit to 1 and sets the second, third and fourth bits to 0 in the bit sequence BS0.

After the zero-filled data DATA1_0, the EDC P0 and the bit sequence BS0 are obtained, the MMC 502 stores the zero-filled data DATA1_0, the EDC P0 and the bit sequence BS0 into the RNVM module 406. For example, the MMC 502 stores the zero-filled data DATA1_0 to a data bit area PG0_D of a PP PG0 and stores a meta data MD0 composed of the EDC P0 and the bit sequence BS0 to a redundancy bit area PG0_R of the PP PG0. In particular, in the data bit area PG0_D of the PP PG0, the first physical sector is used to store the sub-data D0, and the second to the fourth physical sectors are used to store the data with value of zero.

Then, it is assumed that the MMC 502 continues to obtain the sub-data D1 from the host system 11. The MMC 502 generates an EDC P1 (a.k.a. a second EDC) corresponding to the sub-data D1 and stores the sub-data D1 and the EDC P1 into the RNVM module 406. In a manner similar to the above, the MMC 502 assigns the sub-data D1 to the location L1 which is its original location in the data DATA1 and sets a plurality of bits at locations other than the location L1 (i.e., the location L0 and the locations L2 and L3) to zero to generate a zero-filled data DATA1_1 (a.k.a. a second zero-filled data), and generates the EDC P1 according to the zero-filled data DATA1_1.

In addition, the MMC 502 also records a bit sequence BS1 corresponding to the EDC P1 (a.k.a. a second bit sequence). In this example, because only the location L1 stores the data D1 and the bits at the location L0 and the locations L2 and L3 are all zero in the zero-filled data DATA1_1, the MMC 502 sets the second bit to 1 and sets the first, third and fourth bits to 0 in the bit sequence BS1.

After the zero-filled data DATA1_1, the EDC P1 and the bit sequence BS1 are obtained, the MMC 502 stores the zero-filled data DATA1_1, the EDC P1 and the bit sequence BS1 into the RNVM module 406. For example, the MMC 502 stores the zero-filled data DATA1_1 to a data bit area PG1_D of a PP PG1 and stores a meta data MD1 composed of the EDC P1 and the bit sequence BS1 to a redundancy bit area PG1_R of the PP PG1. In particular, in the data bit area PG1_D of the PP PG1, the second physical sector is used to store the sub-data D1, and the first, third and fourth physical sectors are used to the data with the value being zero.

In an embodiment, it is assumed that the MMC 502 needs to combine the sub-data D0 in the PP PG0 and the sub-data D1 in the PP PG1. Referring to FIG. 6B, the MMC 502 can learn that the first physical sector in the PP PG0 stores the sub-data D0 according to the bit sequence BS0 in the meta data MD0. The MMC 502 can learn that the second physical sector in the PP PG1 stores the sub-data D1 according to the bit sequence BS1 in the meta data MD1. Accordingly, the MMC 502, for example, copies the sub-data D0 from the first physical sector in the PP PG0 to the first physical sector of a PP PG4 and copies the sub-data D1 from the second physical sector in the PP PG1 to the second physical sector of the PP PG4. The third and fourth physical sectors in the PP PG4 store the data with value of zero. It should be noted that in the process of combining the sub-data D0 and D1, it is not required to copy the data from the RNVM module 406 to the buffer memory 510 and then write the data back to the RNVM module 406. Instead, the data in the RNVM module 406 can be manipulated directly. For descriptive convenience, a data stored in a data bit area PG4_D of the PP PG4

(i.e., a combined data generated by combining the sub-data D0 and D1) is referred to as "a second data".

In particular, in this embodiment, the MMC 502 also reads the EDCs P0 and P1 and the bit sequences BS0 and BS1 from the meta data MD0 and MD1 to the buffer memory 510. Then, the MMC 502 executes an exclusive or operation on the EDC P0 and the EDC P1 to obtain an EDC P4 (a.k.a. a third EDC). In particular, the EDC P4 is used to check whether "the second data" has the error bit.

In addition, the MMC 502 can also execute the exclusive or operation on the bit sequences BS0 and the bit sequence BS1 to obtain a bit sequence BS4 (a.k.a. a third bit sequence). In this embodiment, after the exclusive or operation is executed, the first and second bits are set to 1 and the third and fourth bits are set to 0 in the bit sequence BS4.

After the EDC P4 and the bit sequence BS4 are obtained, the MMC 502 stores a meta data MD4 composed of the EDC P4 and the bit sequence BS4 to a redundancy bit area PG4_R of the PP PG4.

Referring to FIG. 6A again, in another embodiment, it is assumed that, after the sub-data D0 and D1 are respectively written into the PPs PG0 and PG1, the MMC 502 does not execute a data combining operation as shown by FIG. 6B. It is assumed that the MMC 502 continues to obtain the sub-data D2 from the host system 11. The MMC 502 then generates an EDC P2 and a bit sequence BS2 of a zero-filled data DATA1_2 corresponding to the sub-data D2 in a manner similar to the above. The MMC 502 stores the zero-filled data DATA1_2 to a data bit area PG2_D of a PP PG2 and stores a meta data MD2 composed of the EDC P2 and the bit sequence BS2 to a redundancy bit area PG2_R of the PP PG2.

Similarly, it is assumed that the MMC 502 continues to obtain the sub-data D3 from the host system 11. The MMC 502 then generates an EDC P3 and a bit sequence BS3 of a zero-filled data DATA1_3 corresponding to the sub-data D3 in a manner similar to the above. The MMC 502 stores the zero-filled data DATA1_3 to a data bit area PG3_D of a PP PG3 and stores a meta data MD3 composed of the EDC P3 and the bit sequence BS3 to a redundancy bit area PG3_R of the PP PG3.

Then, referring to FIG. 6A and FIG. 6C together, it is assumed that the MMC 502 needs to combine the sub-data D0 in the PP PG0, the sub-data D1 in the PP PG1, the sub-data D2 in the PP PG2 and the sub-data D3 in the PP PG3. In a similar manner to FIG. 6B, the MMC 502 can copy the sub-data D0 from the first physical sector in the PP PG0 to the first physical sector in a PP PG5, copy the sub-data D1 from the second physical sector in the PP PG1 to the second physical sector in the PP PG5, copy the sub-data D2 from the third physical sector in the PP PG2 to the third physical sector in the PP PG5, and copy the sub-data D3 from the fourth physical sector in the PP PG3 to the fourth physical sector in the PP PG5.

In particular, in this embodiment, the MMC 502 also reads the EDCs P0 to P3 and the bit sequences BS0 to BS3 from the meta data MD0 to MD3 to the buffer memory 510. Then, the MMC 502 executes the exclusive or operation on the EDCs P0 to P3 to obtain an EDC P5. In particular, the EDC P5 is used to check whether a data stored in a' data bit area PG5_D of the PP PG5 (i.e., the combined data of the sub-data D1 to D3) has the error bit.

In addition, the MMC 502 can also execute the exclusive or operation on the bit sequences BS0 to BS3 to obtain a bit sequence BS5. After the EDC P5 and the bit sequence BS5 are obtained, the MMC 502 stores a meta data MD5 composed of the EDC P5 and the bit sequence BS5 to a redundancy bit area PG5_R of the PP PG5.

Second Embodiment

In the second embodiment of the invention, the data writing method of the invention is applied to the RNVM module 406 that store the encrypted data.

Figure 7A:
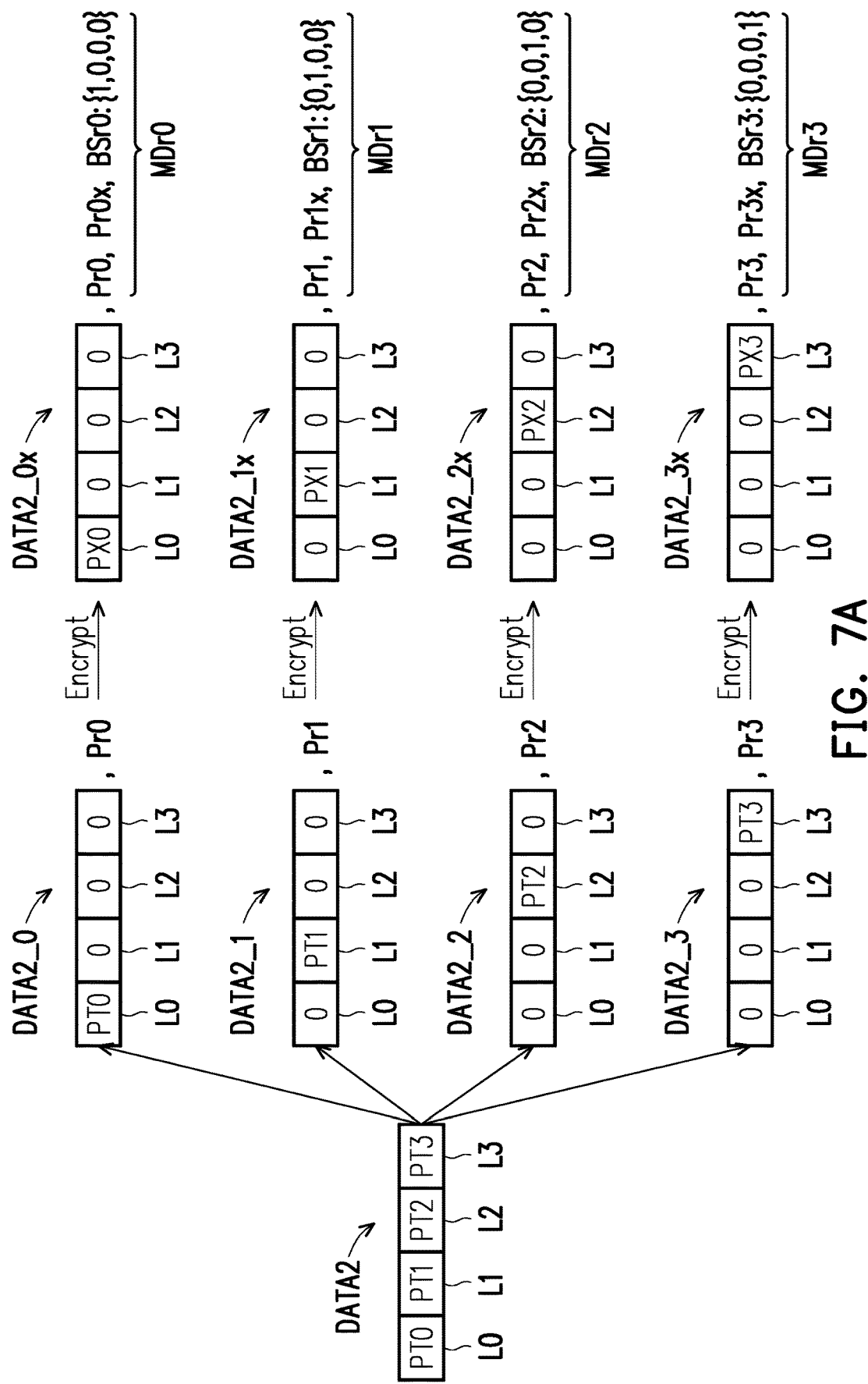
FIG. 7A and FIG. 7B are schematic diagrams illustrating an example of a data writing method applied to an encrypted data according to an exemplary embodiment of the invention.
Figure 7B:
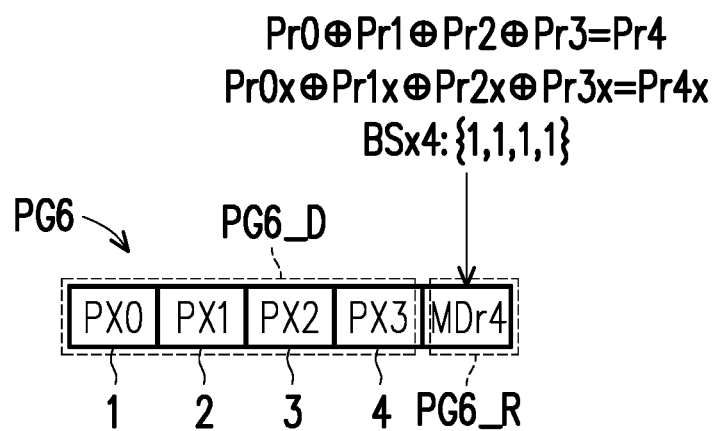

FIG. 7A and FIG. 7B are schematic diagrams illustrating an example of a data writing method applied to an encrypted data according to an exemplary embodiment of the invention.

Referring to FIG. 7A, it is assumed here that a data DATA2 includes sub-data PT0 to PT3 which are not encrypted yet. In other words, each of the sub-data PT0 to PT3 is "a cleartext". A size of the data DATA2 exactly matches a size of the data bit area of one PP, and each of the sub-data PT0 to PT3 exactly matches a size of one physical sector. In the example, of FIG. 7A, the sub-data PT0 to PT3 are arranged in an order. For example, the sub-data PT0 (a.k.a. a first cleartext) is arranged at a location L0 (a.k.a. a first location) in the order; the sub-data PT1 (a.k.a. a second cleartext) is arranged at a location L1 (a.k.a. a second location) in the order; the sub-data PT2 is arranged at a location L2 in the order; the sub-data PT3 is arranged at a location L3 in the order.

It is assumed that the MMC 502 first obtains the sub-data PT0 from the host system 11. The MMC 502 generates an EDC Pr0 corresponding to the sub-data PT0 (a.k.a. a first cleartext EDC). In detail, as similar to the first embodiment, the MMC 502 assigns the sub-data PT0 to the location L0 which is its original location in the data DATA2 and sets a plurality of bits at locations other than the location L0 (i.e., the locations L1 to L3) to zero to generate a zero-filled data DATA2_0, and generates the EDC Pr0 according to the zero-filled data DATA2_0. In particular, the EDC Pr0 is used to check whether the zero-filled data DATA2_0 has the error bit.

Moreover, in the embodiment of FIG. 7A, the MMC 502 further encrypts the sub-data PT0 to generate a corresponding ciphertext PX0 (a.k.a. a first ciphertext). The MMC 502 assigns the ciphertext PX0 to the location L0, and sets a plurality of bits at locations other than the location L0 (i.e., the locations L1 to L3) to zero to generate a zero-filled data DATA2_0$x$, and generates an EDC Pr0$x$ (a.k.a. a first EDC) according to the zero-filled data DATA2_0$x$. In particular, the EDC Pr0$x$ is used to check whether the zero-filled data DATA2_0$x$ has the error bit.

In addition, the MMC 502 also records a bit sequence BSr0 (a.k.a. a first bit sequence). In the bit sequence BSr0, the first bit is set to 1 and the second, third and fourth bits are set to 0.

After the zero-filled data DATA2_0$x$, the EDC Pr0, the EDC Pr0$x$ and the bit sequence BSr0 are obtained, the MMC 502 stores a meta data MDr0 composed of the zero-filled data DATA2_0$x$, the EDC Pr0, the EDC Pr0$x$ and the bit sequence BSr0 into the RNVM module 406.

It is assumed that, in another embodiment, the MMC 502 continues to obtain the sub-data PT1 from the host system 11. In a manner similar to the above, the MMC 502 assigns the sub-data PT1 (a.k.a. a second cleartext) to the location L1 which is its original location in the data DATA2 and sets a plurality of bits at locations other than the location L1 (i.e., the location L0 and the locations L2 and L3) to zero to generate a zero-filled data DATA2_1, and generates an EDC Pr1 according to the zero-filled data DATA2_1.

Then, the MMC 502 further encrypts the sub-data PT1 to generate a corresponding ciphertext PX1 (a.k.a. a second ciphertext). The MMC 502 assigns the ciphertext PX0 to the location L1 and sets a plurality of bits at locations other than the location L1 (i.e., the location L0 and the locations L2 and L3) to zero to generate a zero-filled data DATA2_1x, and generates an EDC Pr1x according to the zero-filled data DATA2_1x. In particular, the EDC Pr1x is used to check whether the zero-filled data DATA2_1x has the error bit.

In addition, the MMC 502 further records a bit sequence BSr1. In the bit sequence BSr1, the second bit is set to 1 and the first, third and fourth bits are set to 0.

After the zero-filled data DATA2_1x, the EDC Pr1, the EDC Pr1x and the bit sequence BSr1 are obtained, the MMC 502 stores a meta data MDr1 composed of the zero-filled data DATA2_1x, the EDC Pr1, the EDC Pr1x and the bit sequence BSr1 into the RNVM module 406.

Then, it is assumed that the MMC 502 continues to obtain the sub-data PT2 and PT3 from the host system 11 in sequence. In a similar manner to the above, the MMC 502 can obtain a zero-filled data DATA2_2x, an EDC Pr2, an EDC Pr2x and a bit sequence BSr2 corresponding to the sub-data PT2, and stores a meta data MDr2 composed of the zero-filled data DATA2_2x, the EDC Pr2, the EDC Pr2x and the bit sequence BSr2 into the RNVM module 406. Similarly, the MMC 502 can obtain a zero-filled data DATA2_3x, an EDC Pr3, an EDC Pr3x and a bit sequence BSr3 corresponding to the sub-data PT3, and stores a meta data MDr3 composed of the zero-filled data DATA2_3x, the EDC Pr3, the EDC Pr3x and the bit sequence BSr3 into the RNVM module 406.

Next, referring to FIG. 7A and FIG. 7B together, it is assumed that the MMC 502 needs to combine the ciphertexts PX0 to PX3 already stored in the RNVM module 406 in the example of FIG. 7A. The MMC 502 can copy the ciphertext PX0 from the PP stored with the zero-filled data DATA2_0x to the first physical sector in a PP PG6, copy the ciphertext PX1 from the PP stored with the zero-filled data DATA2_1x to the second physical sector in the PP PG6, copy the ciphertext PX2 from the PP stored with the zero-filled data DATA2_2x to the third physical sector in the PP PG6, and copy the ciphertext PX3 from the PP stored with the zero-filled data DATA2_3x to the fourth physical sector in the PP PG6.

In particular, in this embodiment, the MMC 502 also reads the EDCs Pr0 to Pr3, the EDCs Pr0x to Pr3x and the bit sequences BSr0 to BSr3 from the meta data MDr0 to MDr3 to the buffer memory 510. Then, the MMC 502 executes the exclusive or operation on the EDCs Pr0 to Pr3 to obtain an EDC Pr4, and executes the exclusive or operation on the EDCs Pr0x to Pr3x to obtain an EDC Pr4x. In addition, the MMC 502 can also execute the exclusive or operation on the bit sequences BSr0 to BSr3 to obtain a bit sequence BSr4. After the EDC Pr4, the EDC Pr4x and the bit sequence BSr4 are obtained, the MMC 502 stores a meta data MDr4 composed of the EDC Pr4, the EDC Pr4x and the bit sequence BSr4 to a redundancy bit area PG6_R of the PP PG6.

It should be noted that, as can be seen from the contents of FIG. 7A and FIG. 7B, storage patterns of the data stored in the RNVM module 406 can be classified into "a not-yet-combined data" and "an already-combined data". In the example of FIG. 7A, the RNVM module 406 stores the ciphertexts PX0 to PX3 which are not yet combined, and the ciphertexts PX0 to PX3 discretely stored in the different PPs are "the not-yet-combined data". In the example of FIG. 7B, the PP PG6 of the RNVM module 406 stores the ciphertexts PX0 to PX3 which are already combined, and the ciphertexts PX0 to PX3 stored in the same PP are "the already-combined data".

In an embodiment, referring to FIG. 7A again, it is assumed that the MMC 502 intends to read the RNVM module 406 to obtain the sub-data PT0 which is not yet combined. The MMC 502 can read the PP stored with the zero-filled data DATA2_0x from the RNVM module 406 to obtain a read data, and decrypt the read data to obtain a decrypted data. Then, the MMC 502 can use the EDC Pr0 to verify whether the obtained decrypted data (e.g., the zero-filled data DATA2_0) has the error bit. If the error bit does not exist, the MMC 502 can output the obtained decrypted data to the host system 11.

In an embodiment, referring to FIG. 7B again, it is assumed that the MMC 502 intends to read the RNVM module 406 to obtain the sub-data PT0 to PT3 which are already combined. The MMC 502 can read the combined encrypted data (i.e., the combined and stored ciphertexts PX0 to PX3) from a data bit area PG6_D in the PP PG6, and decrypt the combined encrypted data to obtain the data DATA2 containing the sub-data PT0 to PT3 in FIG. 7A. Then, the MMC 502 can use the EDC Pr4 to verify whether the data DATA2 obtained after the decryption has the error bit.

It should be noted that, the EDC Pr4x is used to check whether the combined encrypted data (i.e., the combined and stored ciphertexts PX0 to PX3) stored in the data bit area PG6_D of the PP PG6 has the error bit. However, based on characteristics of a data encryption algorithm, when a cleartext is obtained by decrypting the combined encrypted data in the data bit area PG6_D of the PP PG6, the EDC Pr4 (a.k.a. a third cleartext EDC) may not be able to effectively check the error bit for the cleartext and may thus encounter a checking failure.

Therefore, in this embodiment, when the MMC 502 reads the data bit area PG6_D of the PP PG6 to obtain a read data stored in a ciphertext manner, the MMC 502 decrypts the read data to obtain the decrypted data (i.e., the cleartext), and verifies the decrypted data according to the EDC Pr4.

When it is verified that the decrypted data fails according to the EDC Pr4, the read data may belong to "the already combined data". In this case, the MMC 502 encrypts the decrypted data again to obtain an encrypted data, and generate a new encrypted data according to the encrypted data. Then, the MMC 502 determines whether the new EDC is identical to the third EDC Pr4x. When the new EDC is identical to the third EDC Pr4x, the MMC 502 can determine that the decrypted data does not have the error, and output the decrypted data to the host system 11. When the new EDC is different from the third EDC Pr4x, the MMC 502 can determine that the decrypted data has the error.

Figure 8:
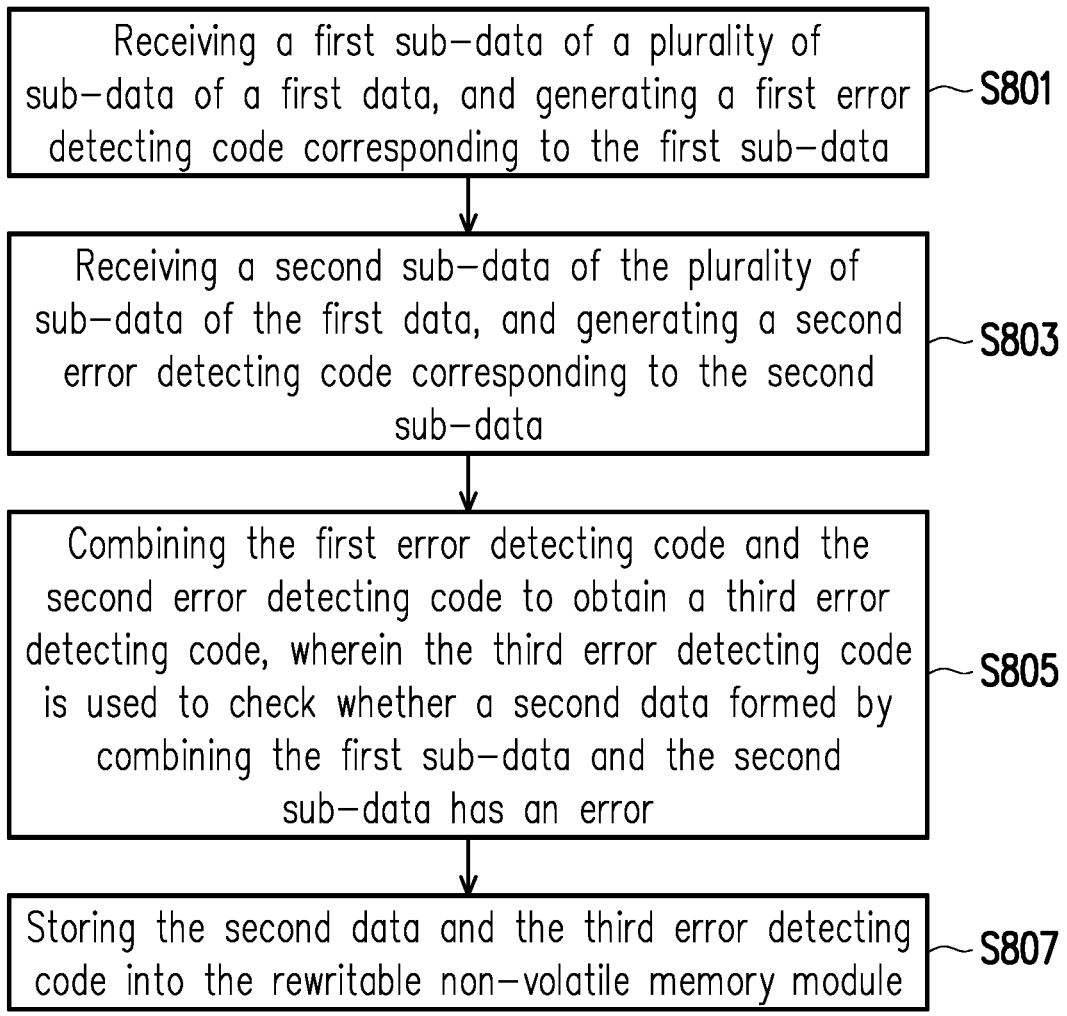
FIG. 8 is a flowchart illustrating a data writing method according to an exemplary embodiment of the invention.

FIG. 8 is a flowchart illustrating a data writing method according to an exemplary embodiment of the invention.

Referring to FIG. 8, in step S801, the MMC 502 receives a first sub-data of a plurality of sub-data of a first data, and generates a first EDC corresponding to the first sub-data. In step S803, the MMC 502 receives a second sub-data of the plurality of sub-data of the first data, and generates a second EDC corresponding to the second sub-data. In step S805, the MMC 502 combines the first EDC and the second EDC to obtain a third EDC. Here, the third EDC is used to check whether a second data formed by combining the first sub-data and the second sub-data has an error. In step S807, the MMC 502 stores the second data and the third EDC into the RNVM module 406.

In summary, the data writing method, the memory control circuit unit and the memory storage device of the invention can simply read the EDC of the sub-data to be combined without reading the sub-data to be combined to the buffer memory in the process of generating the combined data and the EDC corresponding to the combined data. Then, according to the read EDC, the EDC corresponding to the combined data can be generated. Further, in the process of generating the combined data, because the combined data can be generated by directly moving the sub-data in the RNVM module without reading the sub-data to be combined to the buffer memory in the invention, the problem of the error bit generated in the combined data in the prior art can be solved.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The previously described exemplary embodiments of the present invention have the advantages aforementioned, wherein the advantages aforementioned not required in all versions of the present invention.

It will be apparent to those skilled in the art that various modifications and variations can be made to the structure of the invention without departing from the scope or spirit of the invention. In view of the foregoing, it is intended that the present invention cover modifications and variations of this invention provided they fall within the scope of the following claims and their equivalents.

What is claimed is:

1. A data writing method for a rewritable non-volatile memory module, and the data writing method comprising:
   receiving a first sub-data of a plurality of sub-data of a first data;
   assigning the first sub-data to a first location and setting bits at locations other than the first location to zero to generate a first zero-filled data;
   generating a first error detecting code according to the first zero-filled data;
   storing the first zero-filled data and the first error detecting code into a first physical page;
   receiving a second sub-data of the plurality of sub-data of the first data;
   assigning the second sub-data to a second location and setting bits at locations other than the second location to zero to generate a second zero-filled data;
   generating a second error detecting code according to the second zero-filled data;
   storing the second zero-filled data and the second error detecting code into a second physical page;
   copying the first sub-data of the first physical page to a third physical page and copying the second sub-data of the second physical page to the third physical page;
   combining the first error detecting code and the second error detecting code to obtain a third error detecting code, wherein the third error detecting code is configured to check whether a second data formed by combining the first sub-data and the second sub-data in the third physical page has an error; and
   storing the third error detecting code into the third physical page.

2. The data writing method according to claim 1, wherein the plurality of sub-data are arranged at a plurality of locations in an order such that the first sub-data is located at a first location of the plurality of locations and the second sub-data is located at a second location of the plurality of locations.

3. The data writing method according to claim 2, further comprising:
   recording a first bit sequence corresponding to the first zero-filled data, wherein a bit corresponding to the first location is represented by a first value and bits corresponding to the locations other than the first location are represented by a second value in the first bit sequence; and
   recording a second bit sequence corresponding to the second zero-filled data, wherein a bit corresponding to the second location is represented by the first value and bits corresponding to the locations other than the second location are represented by the second value in the second bit sequence.

4. The data writing method according to claim 3, wherein the step of combining the first error detecting code and the second error detecting code to obtain the third error detecting code comprises:
   executing an exclusive or operation according to the first error detecting code and the second error detecting code to obtain the third error detecting code, and recording a third bit sequence corresponding to the second data,
   wherein bits corresponding to the first location and the second location are represented by the first value and bits corresponding to locations other than the first location and the second location are represented by the second value in the third bit sequence.

5. The data writing method according to claim 1,
   wherein the step of combining the first error detecting code and the second error detecting code to obtain the third error detecting code comprises:
   reading the first error detecting code from the first physical page, and combining the first error detecting code and the second error detecting code to obtain the third error detecting code.

6. The data writing method according to claim 5, wherein a size of the first data matches a size of the third physical page, and the plurality of sub-data of the first data are arranged at a plurality of locations of the third physical page in an order such that the first sub-data is located at the first location of the plurality of locations and the second sub-data is located at the second location of the plurality of locations,
   wherein the step of storing the second data and the third error detecting code into the third physical page comprises:
   storing the second sub-data into the third physical page so that the first sub-data and the second sub-data in the third physical page form the second data, wherein the first sub-data is located at the first location and the second sub-data is located at the second location in the third physical page.

7. The data writing method according to claim 1, wherein the first sub-data is a first ciphertext generated by encrypting a first cleartext,
   wherein the step of receiving the first sub-data of the plurality of sub-data of the first data, and generating the first error detecting code corresponding to the first sub-data comprises:
   generating a first cleartext error detecting code corresponding to the first cleartext, and storing the first ciphertext, the first cleartext error detecting code and the first error detecting code into the third physical page.

8. The data writing method according to claim 7, wherein a size of the first data matches a size of the third physical page, the plurality of sub-data of the first data are arranged at a plurality of locations of the third physical page in an order such that the first sub-data is located at the first location of the plurality of locations and the second sub-data is located at the second location of the plurality of locations, the second sub-data is a second ciphertext generated by encrypting a second cleartext, and the method further comprises:

storing the second ciphertext into the third physical page so that the first ciphertext and the second ciphertext in the third physical page form the second data, wherein the first ciphertext is located at the first location and the second ciphertext is located at the second location in the third physical page.

9. The data writing method according to claim 8, further comprising:

combining the first cleartext error detecting code and a second cleartext error detecting code corresponding to the second cleartext to obtain a third cleartext error detecting code; and storing the third cleartext error detecting code into the third physical page.

10. The data writing method according to claim 9, further comprising:

reading the third physical page to obtained a read data, decrypting the read data to obtain a decrypted data, and verifying the decrypted data according to the third cleartext error detecting code;

when verifying that the decrypted data fails according to the third cleartext error detecting code, encrypting the decrypted data to obtain an encrypted data, and generating a new error detecting code according to the encrypted data;

determining whether the new error detecting code is identical to the third error detecting code;

determining that the decrypted data does not have the error when the new error detecting code is identical to the third error detecting code; and determining that the decrypted data has the error when the new error detecting code is different from the third error detecting code.

11. A memory control circuit unit, configured to control a rewritable non-volatile memory module, the memory control circuit unit comprising:

a host interface, configured to couple to a host system, a memory interface, configured to couple to the rewritable non-volatile memory module;

a memory management circuit, coupled to the host interface and the memory interface, wherein the memory management circuit is configured to receive a first sub-data of a plurality of sub-data of a first data, assign the first sub-data to a first location and set bits at locations other than the first location to zero to generate a first zero-filled data, generate a first error detecting code according to the first zero-filled data, and store the first zero-filled data and the first error detecting code into a first physical page, wherein the memory management circuit is further configured to receive a second sub-data of the plurality of sub-data of the first data, assign the second sub-data to a second location and set bits at locations other than the second location to zero to generate a second zero-filled data, generate a second error detecting code according to the second zero-filled data, and store the second zero-filled data and the second error detecting code into a second physical page, wherein the memory management circuit is further configured to copy the first sub-data of the first physical page to a third physical page and copy the second sub-data of the second physical page to the third physical page, and combine the first error detecting code and the second error detecting code to obtain a third error detecting code, wherein the third error detecting code is configured to check whether a second data formed by combining the first sub-data and the second sub-data in the third physical page has an error, wherein the memory management circuit is further configured to store the third error detecting code into the third physical page.

12. The memory control circuit unit according to claim 11, wherein the plurality of sub-data are arranged at a plurality of locations in an order such that the first sub-data is located at a first location of the plurality of locations and the second sub-data is located at a second location of the plurality of locations.

13. The memory control circuit unit according to claim 12, wherein the memory management circuit is further configured to record a first bit sequence corresponding to the first zero-filled data, wherein a bit corresponding to the first location is represented by a first value and bits corresponding to the locations other than the first location are represented by a second value in the first bit sequence, and the memory management circuit is further configured to record a second bit sequence corresponding to the second zero-filled data, wherein a bit corresponding to the second location is represented by the first value and bits corresponding to the locations other than the second location are represented by the second value in the second bit sequence.

14. The memory control circuit unit according to claim 13, wherein in the operation of combining the first error detecting code and the second error detecting code to obtain the third error detecting code, the memory management circuit is further configured to execute an exclusive or operation according to the first error detecting code and the second error detecting code to obtain the third error detecting code, and record a third bit sequence corresponding to the second data, wherein bits corresponding to the first location and the second location are represented by the first value and bits corresponding to locations other than the first location and the second location are represented by the second value in the third bit sequence.

15. The memory control circuit unit according to claim 11, wherein in the operation of combining the first error detecting code and the second error detecting code to obtain the third error detecting code, the memory management circuit is further configured to read the first error detecting code from the first physical page, and combine the first error detecting code and the second error detecting code to obtain the third error detecting code.

16. The memory control circuit unit according to claim 15, wherein a size of the first data matches a size of the third physical page, and the plurality of sub-data of the first data are arranged at a plurality of locations of the third physical page in an order such that the first sub-data is located at the first location of the plurality of locations and the second sub-data is located at the second location of the plurality of locations,
   wherein in the operation of storing the second data and the third error detecting code into the third physical page, the memory management circuit is further configured to store the second sub-data into the third physical page so that the first sub-data and the second sub-data in the third physical page form the second data, wherein the first sub-data is located at the first location and the second sub-data is located at the second location in the third physical page.

17. The memory control circuit unit according to claim 11, wherein the first sub-data is a first ciphertext generated by encrypting a first cleartext,
   wherein in the operation of receiving the first sub-data of the plurality of sub-data of the first data, and generating the first error detecting code corresponding to the first sub-data,
   the memory management circuit is further configured to generate a first cleartext error detecting code corresponding to the first cleartext, and store the first ciphertext, the first cleartext error detecting code and the first error detecting code into the third physical page.

18. The memory control circuit unit according to claim 17, wherein a size of the first data matches a size of the third physical page, the plurality of sub-data of the first data are arranged at a plurality of locations of the third physical page in an order such that the first sub-data is located at the first location of the plurality of locations and the second sub-data is located at the second location of the plurality of locations, and the second sub-data is a second ciphertext generated by encrypting a second cleartext, wherein
   the memory management circuit is further configured to store the second ciphertext into the third physical page so that the first ciphertext and the second ciphertext in the third physical page form the second data, wherein the first ciphertext is located at the first location and the second ciphertext is located at the second location in the third physical page.

19. The memory control circuit unit according to claim 18, wherein
   the memory management circuit is further configured to combine the first cleartext error detecting code and a second cleartext error detecting code corresponding to the second cleartext to obtain a third cleartext error detecting code, and
   the memory management circuit is further configured to store the third cleartext error detecting code into the third physical page.

20. The memory control circuit unit according to claim 19, wherein
   the memory management circuit is further configured to read the third physical page to obtained a read data, decrypt the read data to obtain a decrypted data, and verify the decrypted data according to the third cleartext error detecting code,
   when verifying that the decrypted data fails according to the third cleartext error detecting code, the memory management circuit is further configured to encrypt the decrypted data to obtain an encrypted data, and generate a new error detecting code according to the encrypted data;
   the memory management circuit is further configured to determine whether the new error detecting code is identical to the third error detecting code,
   the memory management circuit is further configured to determine that the decrypted data does not have the error when the new error detecting code is identical to the third error detecting code, and
   the memory management circuit is further configured to determine that the decrypted data has the error when the new error detecting code is different from the third error detecting code.

21. A memory storage device, comprising:
   a connection interface unit, configured to couple to a host system;
   a rewritable non-volatile memory module; and
   a memory control circuit unit, coupled to the connection interface unit and the rewritable non-volatile memory module,
   wherein the memory control circuit unit is configured to receive a first sub-data of a plurality of sub-data of a first data, assign the first sub-data to a first location and set bits at locations other than the first location to zero to generate a first zero-filled data, generate a first error detecting code according to the first zero-filled data, and store the first zero-filled data and the first error detecting code into a first physical page,
   wherein the memory control circuit unit is further configured to receive a second sub-data of the plurality of sub-data of the first data, assign the second sub-data to a second location and set bits at locations other than the second location to zero to generate a second zero-filled data, generate a second error detecting code according to the second zero-filled data, and store the second zero-filled data and the second error detecting code into a second physical page,
   wherein the memory control circuit unit is further configured to copy the first sub-data of the first physical page to a third physical page and copy the second sub-data of the second physical page to the third physical page, and combine the first error detecting code and the second error detecting code to obtain a third error detecting code, wherein the third error detecting code is configured to check whether a second data formed by combining the first sub-data and the second sub-data in the third physical page has an error,
   wherein the memory control circuit unit is further configured to store the third error detecting code into the third physical page.

22. The memory storage device according to claim 21, wherein the plurality of sub-data are arranged at a plurality of locations in an order such that the first sub-data is located at a first location of the plurality of locations and the second sub-data is located at a second location of the plurality of locations.

23. The memory storage device according to claim 22, wherein
   the memory control circuit unit is further configured to record a first bit sequence corresponding to the first zero-filled data, wherein a bit corresponding to the first location is represented by a first value and bits corresponding to the locations other than the first location are represented by a second value in the first bit sequence, and
   the memory control circuit unit is further configured to record a second bit sequence corresponding to the second zero-filled data, wherein a bit corresponding to the second location is represented by the first value and bits corresponding to the locations other than the second location are represented by the second value in the second bit sequence.

24. The memory storage device according to claim 23, wherein in the operation of combining the first error detecting code and the second error detecting code to obtain the third error detecting code,
- the memory control circuit unit is further configured to execute an exclusive or operation according to the first error detecting code and the second error detecting code to obtain the third error detecting code, and record a third bit sequence corresponding to the second data,
- wherein bits corresponding to the first location and the second location are represented by the first value and bits corresponding to locations other than the first location and the second location are represented by the second value in the third bit sequence.

25. The memory storage device according to claim 21,
- wherein in the operation of combining the first error detecting code and the second error detecting code to obtain the third error detecting code,
- the memory control circuit unit is further configured to read the first error detecting code from the first physical page, and combine the first error detecting code and the second error detecting code to obtain the third error detecting code.

26. The memory storage device according to claim 25, wherein a size of the first data matches a size of the third physical page, and the plurality of sub-data of the first data are arranged at a plurality of locations of the third physical page in an order such that the first sub-data is located at the first location of the plurality of locations and the second sub-data is located at the second location of the plurality of locations,
- wherein in the operation of storing the second data and the third error detecting code into the third physical page,
- the memory control circuit unit is further configured to store the second sub-data into the third physical page so that the first sub-data and the second sub-data in the third physical page form the second data, wherein the first sub-data is located at the first location and the second sub-data is located at the second location in the third physical page.

27. The memory storage device according to claim 21, wherein the first sub-data is a first ciphertext generated by encrypting a first cleartext,
- wherein in the operation of receiving the first sub-data of the plurality of sub-data of the first data, and generating the first error detecting code corresponding to the first sub-data,
- the memory control circuit unit is further configured to generate a first cleartext error detecting code corresponding to the first cleartext, and store the first ciphertext, the first cleartext error detecting code and the first error detecting code into the third physical page.

28. The memory storage device according to claim 27, wherein a size of the first data matches a size of the third physical page, the plurality of sub-data of the first data are arranged at a plurality of locations of the third physical page in an order such that the first sub-data is located at the first location of the plurality of locations and the second sub-data is located at the second location of the plurality of locations, and the second sub-data is a second ciphertext generated by encrypting a second cleartext, wherein
- the memory control circuit unit is further configured to store the second ciphertext into the third physical page so that the first ciphertext and the second ciphertext in the third physical page form the second data, wherein the first ciphertext is located at the first location and the second ciphertext is located at the second location in the third physical page.

29. The memory storage device according to claim 28, wherein
- the memory control circuit unit is further configured to combine the first cleartext error detecting code and a second cleartext error detecting code corresponding to the second cleartext to obtain a third cleartext error detecting code, and
- the memory control circuit unit is further configured to store the third cleartext error detecting code into the third physical page.

30. The memory storage device according to claim 29, wherein
- the memory control circuit unit is further configured to read the third physical page to obtained a read data, decrypt the read data to obtain a decrypted data, and verify the decrypted data according to the third cleartext error detecting code,
- when verifying that the decrypted data fails according to the third cleartext error detecting code, the memory control circuit unit is further configured to encrypt the decrypted data to obtain an encrypted data and generate a new error detecting code according to the encrypted data,
- the memory control circuit unit is further configured to determine whether the new error detecting code is identical to the third error detecting code,
- the memory control circuit unit is further configured to determine that the decrypted data does not have the error when the new error detecting code is identical to the third error detecting code, and
- the memory control circuit unit is further configured to determine that the decrypted data has the error when the new error detecting code is different from the third error detecting code.

* * * * *